Dec. 3, 1929.  E. H. REYNOLDS  1,738,318
PURIFYING FOOD PRODUCTS
Original Filed Dec. 24, 1917
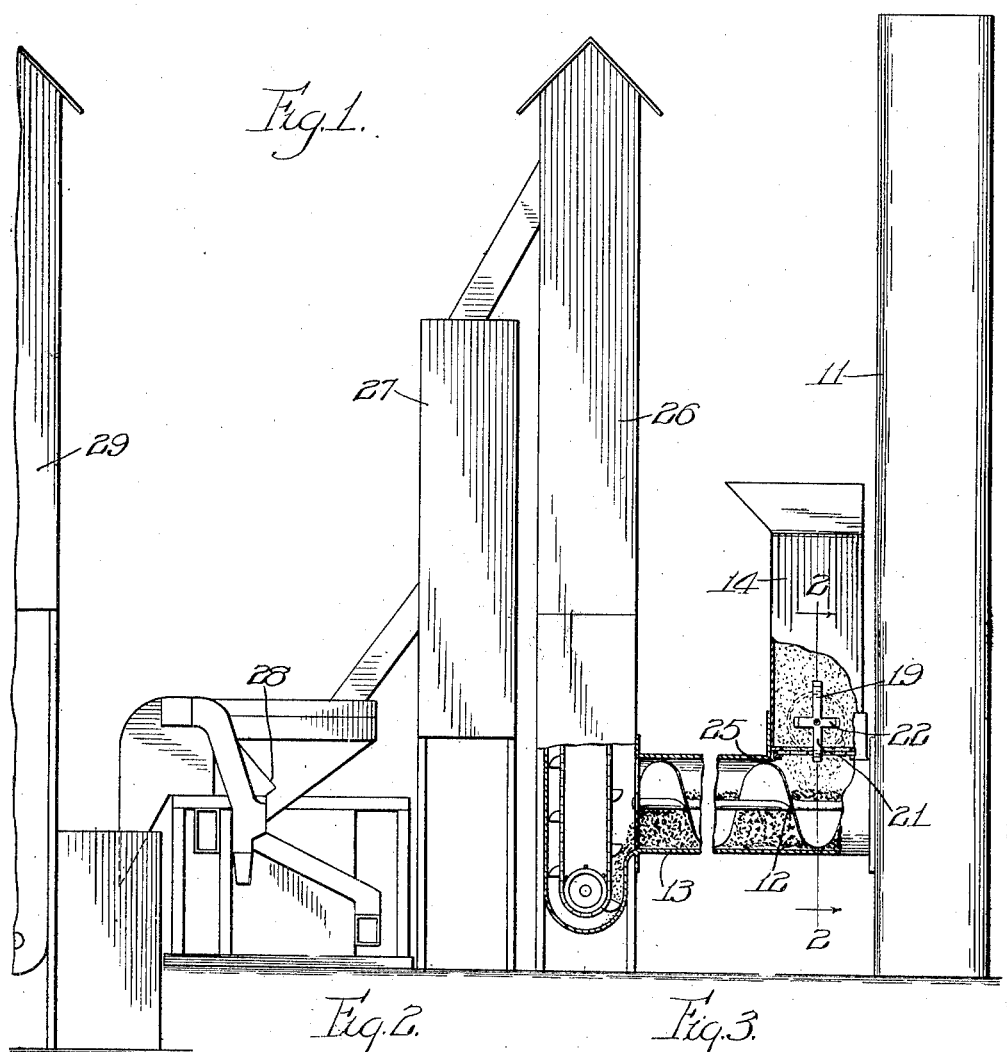
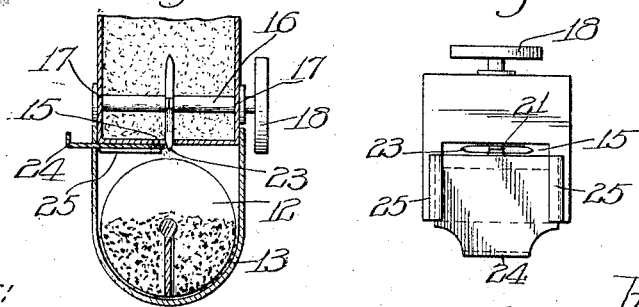

Patented Dec. 3, 1929

1,738,318

UNITED STATES PATENT OFFICE

EARL H. REYNOLDS, OF CHICAGO, ILLINOIS, ASSIGNOR TO REYNOLDS BLEACHER COMPANY, OF CHICAGO, ILLINOIS, A CORPORATION OF ILLINOIS

PURIFYING FOOD PRODUCTS

Application filed December 24, 1917, Serial No. 208,601. Renewed April 17, 1925.

This invention relates in general to means for purifying food products of various characters, and has more particular reference to the elimination of the souring undesirable acids sometimes present from one cause or another upon the surface of the particles of the product,—for example, grain after being bleached with sulphurous fumes and steam may carry with it a small amount of residual sulphurous acid, the elimination of which is within the contemplation of my invention, it being understood, however, that the invention has other application as for example to English walnuts where the sourness is due to surface reactions of the product itself. It will therefore be understood that the invention, while having a particularly valuable application in connection with cereals, such as oats, corn and the like, may be used effectively to purify or sweeten products of other character, as, for further example, beans.

An important object of the invention is the provision of a simple apparatus and a simple process for purifying or sweetening grain from a grain bleacher and this without requiring the provision of complicated or extensive additional devices and equipment.

Another important object of the invention is the provision of a process of high efficiency and capable of adaptation to use in a large variety of products as hereinabove mentioned.

Other objects and advantages of the invention will be apparent as it is better understood from the following description when considered in connection with the accompanying drawing illustrating a preferred embodiment thereof.

On the drawing,

Figure 1 is a diagrammatic view of an apparatus adapted to disclose an embodiment of my present invention as applied to oat treatment;

Fig. 2 is a section taken substantially on the line 2—2 of Fig. 1; and

Fig. 3 is a bottom plan view of the lime carrying tank.

In order to neutralize the undesirable acids which sour the material or product, it is my intention to mix with such product finely comminuted lime or a like material. The lime is preferably of the commercial form of hydrated lime, which is a powder of extreme fineness and of a character causing it to adhere to the pieces or grains or kernels of the material being treated.

Referring to Figure 1 reference character 11 designates an oats bleacher or other suitable source of oats to be purified. The oats are taken from the bottom of the bleacher by a screw conveyor indicated at 12 and moving in a conveying channel 13. Adjacent the conveyor I have mounted a bin or tank 14 into which may be poured a desirable quantity of evaporated lime. This material is somewhat difficult to feed in a small continuous quantity and to this end I have given the bin a novel construction.

The bin is provided with a slot 15 in its bottom and located directly above the receiving end of the screw conveyor. A shaft 16 having bearings at 17 in the sides of the bin is provided with a driving pulley 18 without the bin and a rotating ejector 19 within the bin. This ejector has a pair of relatively long arms 21 and a pair of relatively short arms 22. The longer arms are sharpened, as indicated at 23 and the longer arms are adapted to enter into the slot 15 and close to one side of it as may be seen by viewing Fig. 3 which is a bottom plan view, the other two arms being shorter do not enter the slot and serve merely as agitators. A slide 24 mounted in guides 25 is provided beneath the bin to extend under the front part of the slot. This slide determines the width of the slot and consequently the rate of feed of the lime as propelled from the bin by the rotating ejector 19.

In the present instance the grain is fed forward continuously by the screw conveyor and lime is constantly added in small quantities by the ejector. The screw conveyor is preferably of sufficient length to cause a sufficient agitation of the kernels or pieces after the lime is added so that the lime provides a fine powder coating over all of the surface of the grain.

After the product is thoroughly coated with lime, it is received by an elevator leg 26 from the screw conveyor and carried up and dropped into a storage bin 27 where it is permitted to remain a sufficient time to permit complete neutralization to take place. This I have found to be in the case of oats, from 24 to 48 hours. From the storage bin 27 the oats with the coating of lime, and solid products of neutralization if any be present, are then scoured to remove all the coating from the material or product. In the embodiment of the invention shown on the drawing this is accomplished in the clipper ordinarily used merely to clip the oats. This clipper, indicated diagrammatically at 28, is the usual commercial device and in clipping the oats, it causes them to rub one over the other in this suction, the scouring action thus taking place removing the coating and permitting it to be carried off by the suction and the oats delivered from the clipper in clean and sweetened condition.

It is, however, desirable to permit the oats to stand for a while after leaving the clipper in order that all the gases resulting from the neutralization may pass off and to this end the oats are stored in an elevator 29 like the elevator formed of the leg 26 and bin 27 preferably for another 24 to 48 hours, after which the purification is complete.

Where the invention is used for English walnuts, for example, the process and treatment are exactly the same except that instead of the device 28 being a clipper it is a suitable scouring device of any well-known or preferred type.

It is thought that the invention and many of its advantages and applications will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The process of neutralizing surface acidity of grain which consists in: applying dry lime in the form of a finely comminuted powder to the grain while it is in dry state; storing the mixture of lime and grain while it is in dry state until the neutralizing action is completed; and then removing the excess lime from the grain, substantially as specified.

2. The process of treating grain which consists in: subjecting the grain to a bleaching operation by causing sulphur dioxide fumes to pass into contact with the grain; then effecting the complete removal of residual acidity without wetting the grain by mixing with the grain a dry neutralizing agent in the form of a finely comminuted powder to remove the surface acidity from the grain while it is in the dry state; and, when the neutralizing action is completed, removing the excess neutralizing agent from the grain, substantially as specified.

3. The process of treating grain which consists in: subjecting the grain to a bleaching operation by causing sulphur dioxide fumes to pass into contact with the grain; then without moistening the grain mixing with the grain dry lime in the form of a finely comminuted powder to remove the surface acidity from the grain without wetting the grain; and, when the neutralizing action is completed, removing the excess dry lime from the grain, substantially as specified.

EARL H. REYNOLDS.